Patented Feb. 7, 1928.

1,658,231

UNITED STATES PATENT OFFICE.

ARTHUR W. DOX AND LESTER YODER, OF DETROIT, MICHIGAN, ASSIGNORS TO PARKE, DAVIS & COMPANY, OF DETROIT, MICHIGAN, A CORPORATION OF MICHIGAN.

CARBAMATE OF HALOGEN-SUBSTITUTED TERTIARY ALCOHOLS.

No Drawing.   Application filed October 9, 1922. Serial No. 593,412.

The invention relates to a new series of bodies which may be used as therapeutic agents and the object is to obtain a product which will possess marked sedative and hypnotic properties but which will be tasteless, odorless, non-volatile and of very low toxicity.

We have found that the halogen substituted tertiary alcohols which are already in use as hypnotics and sedatives but which have a burning taste, a camphor-like odor and low melting point may be converted into new derivatives of still greater physiological activity, but devoid of taste, odor and volatility.

In general our process for the manufacture of these new substances consists in subjecting a metallic derivative of a halogen substituted tertiary alcohol in an inert solvent to the action of carbonyl chloride and treating the resulting chlorocarbonate with ammonia. The product obtained in this manner may be designated as a carbamate (urethane) of a halogen substituted tertiary alcohol.

As a specific example of the process 177 parts of anhydrous tri-chloro-tertiary-butyl alcohol mixed with 3500 parts of benzene are treated with 23 parts of finely divided sodium at ordinary temperature until almost the whole is dissolved. The liquor is gradually decanted into 600 parts of a 20% solution of carbonyl chloride in toluene. After allowing the mixture to stand for a short time, ammonia gas is passed in until a test portion gives an alkaline reaction with litmus. The precipitate of sodium chloride and ammonium chloride is filtered off, and the filtrate subjected to distillation to remove most of the benzene and toluene. The residue is treated with charcoal, filtered and allowed to crystallize and the crystals are purified by recrystallizing from a mixture of benzene and ligroin.

The process may be represented by the following chemical equations:—

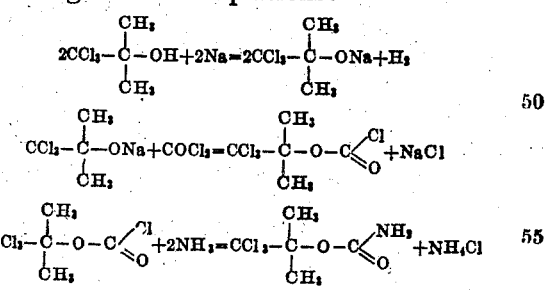

The product obtained by the above process may be designated as the carbamate of tri-chloro-tertiary butyl alcohol and consists of white scaly crystals having no taste or odor and melting at about 102° centigrade. The substance is readily soluble in benzene, alcohol and ether but difficulty soluble in ligroin and water. The substance also has valuable physiological properties and may be used as a sedative and hypnotic but at the same time it possesses very low toxicity.

As another specific example of the manufacture of a similar substance belonging to the same general series of bodies, 143 parts of methyl dichloroacetate are slowly added to a Grignard mixture consisting of 24 parts of magnesium, 250 parts of anhydrous ether and 190 parts of methyl bromide. The mixture is gently refluxed for one-half hour; then, when the reaction is complete, 1000 parts of 20% solution of carbonyl chloride in toluene are added, and the resulting mixture allowed to stand for some time. When this reaction is complete, ammonia gas is passed in and the product isolated and purified as described in the previous example.

The product produced by the second example may be designated as the carbamate of dichloromethyl-dimethyl-carbinol having the following structural formula:

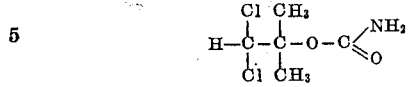

It consists of white scaly crystals having no taste or odor and melting about 122° centigrade. The crystals are soluble in benzene, alcohol and ether. This product also possesses physiological properties which are similar to the carbamate of tri-chloro-tertiary butyl alcohol described above.

It will be noted that the first step in the processes as above described is the formation of a metallic salt of the halogen substituted tertiary alcohols. This step consists in the treatment of the alcohol with an alkali forming metal which may be sodium, magnesium or other suitable metal of the alkali group or the alkaline earth group. Where the expression "alkali forming metal" is used in the appended claims it is intended to cover the metals above referred to.

What we claim as our invention is:—

1. A new body forming one of a series which may be designated as the carbamates of halogen substituted tertiary alcohols, said body having the following characteristics; sedative and hypnotic properties, low toxicity, tasteless, odorless and non-volatile.

2. A new body forming one of a series which may be designated as the carbamates of halogen substituted tertiary butyl alcohol, said body having the following characteristics; sedative and hypnotic properties, low toxicity, tasteless, odorless, non-volatile, white crystalline form readily soluble in benzene, alcohol and ether and difficultly soluble in ligroin and water.

3. A new body forming one of a series which may be designated as the carbamates of tri-halogen-tertiary butyl alcohol, said body having the following characteristics; readily soluble in benzene, alcohol and ether, difficultly soluble in ligroin and water and of white crystalline form.

4. A new body which may be designated as the carbamate of trichloro-tertiary butyl alcohol which melts substantially at 102° centigrade and is soluble in benzene, alcohol and ether, difficultly soluble in ligroin and water and of white crystalline form.

5. A process for the manufacture of the carbamates of trichloro-tertiary butyl alcohol comprising the treatment of an alkali metal salt of trichloro-tertiary butyl alcohol with carbonyl chloride in an inert solvent, introducing ammonia gas into said solvent, separating the chloride precipitate, dissolving the filtrate to remove the inert solvent therefrom and separating the carbamate by crystallization.

In testimony whereof we affix our signatures.

ARTHUR W. DOX.
LESTER YODER.